(12) United States Patent
Wu

(10) Patent No.: US 9,041,344 B2
(45) Date of Patent: May 26, 2015

(54) STANDBY BATTERY BOX FOR ELECTRIC CYLINDER

(75) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 339 days.

(21) Appl. No.: 13/481,493

(22) Filed: May 25, 2012

(65) Prior Publication Data

US 2013/0314026 A1 Nov. 28, 2013

(51) Int. Cl.
| H02J 7/00 | (2006.01) |
| H02J 9/00 | (2006.01) |
| H01M 10/46 | (2006.01) |

(52) U.S. Cl.
CPC .............. *H02J 7/0029* (2013.01); *H01M 10/46* (2013.01); *H02J 7/0063* (2013.01); *H02J 9/002* (2013.01); *H02J 9/005* (2013.01); *H02J 2007/004* (2013.01); *H02J 2007/0067* (2013.01)

(58) Field of Classification Search
CPC ......... H02J 7/00; H02J 7/0042; H02J 7/0031; H02J 200/0042; H01M 10/45; H01M 16/00
USPC .......................... 320/107, 113, 118, 121, 134
See application file for complete search history.

(56) References Cited

U.S. PATENT DOCUMENTS

| 3,891,917 | A | * | 6/1975 | Harris ............................ 324/382 |
| 4,575,680 | A | | 3/1986 | Gold |
| 5,177,425 | A | * | 1/1993 | Goto ............................. 320/130 |
| 5,592,030 | A | | 1/1997 | Adahan |
| 5,604,708 | A | | 2/1997 | Helms et al. |
| 6,164,491 | A | * | 12/2000 | Bustos et al. ................. 221/211 |
| 6,249,106 | B1 | | 6/2001 | Turner et al. |
| 6,741,065 | B1 | * | 5/2004 | Ishii et al. ..................... 320/122 |
| 7,049,756 | B2 | * | 5/2006 | Aiba et al. .................... 315/172 |
| 7,298,108 | B2 | * | 11/2007 | Nagai et al. ................... 318/469 |
| 7,420,295 | B2 | * | 9/2008 | Omae et al. ..................... 307/66 |
| 7,562,403 | B2 | * | 7/2009 | Wei et al. ..................... 5/81.1 R |
| 7,589,500 | B2 | * | 9/2009 | Johnson et al. ............... 320/134 |

(Continued)

FOREIGN PATENT DOCUMENTS

| CN | 1143277 A | 2/1997 |
| CN | 102355026 A | 2/2012 |

(Continued)

OTHER PUBLICATIONS

Denmark Official Action issued on Jan. 11, 2013.

(Continued)

*Primary Examiner* — Helen Rossoshek
(74) *Attorney, Agent, or Firm* — Chun-Ming Shih; HDLS IPR Services

(57) ABSTRACT

A standby battery box for an electric cylinder is electrically connected to a control box for driving the electric cylinder and includes a charge-discharge device and a rechargeable battery. The charge-discharge device includes a protection unit, a power conversion unit, a voltage detection unit, a control unit, a discharge unit, a display unit, and a switch unit. The rechargeable battery is electrically connected to the charge-discharge device. When a startup switch of the switch unit is pressed, the charge-discharge device delivers the electricity of the rechargeable battery into the control box. When a shutoff switch of the switch unit is pressed, the charge-discharge device does not supply power, thereby protecting the standby battery box from being exhausted.

19 Claims, 6 Drawing Sheets

(56) References Cited

U.S. PATENT DOCUMENTS

| | | | |
|---|---|---|---|
| 7,592,773 B2 * | 9/2009 | Pellenc | 320/114 |
| 8,047,867 B2 * | 11/2011 | Wu | 439/517 |
| 8,169,340 B2 * | 5/2012 | Oyobe et al. | 340/932.2 |
| 8,269,454 B2 * | 9/2012 | Yang | 320/107 |
| 8,378,636 B2 * | 2/2013 | Wu et al. | 320/134 |
| 8,436,584 B2 * | 5/2013 | Johnson et al. | 320/132 |
| 2003/0093863 A1 | 5/2003 | Grove | |
| 2003/0193318 A1 * | 10/2003 | Ozawa et al. | 320/132 |
| 2004/0101744 A1 * | 5/2004 | Suzuki | 429/61 |
| 2004/0227492 A1 | 11/2004 | Lo | |
| 2006/0206246 A1 * | 9/2006 | Walker | 701/16 |
| 2007/0151025 A1 * | 7/2007 | Wei et al. | 5/81.1 R |
| 2007/0250725 A1 | 10/2007 | Chia et al. | |
| 2009/0189568 A1 | 7/2009 | Vasselin et al. | |
| 2011/0014501 A1 * | 1/2011 | Scheucher | 429/7 |
| 2011/0083578 A1 * | 4/2011 | Sami | 105/50 |
| 2011/0148346 A1 * | 6/2011 | Gagosz et al. | 320/103 |
| 2012/0293002 A1 * | 11/2012 | Ye et al. | 307/66 |
| 2013/0313907 A1 * | 11/2013 | Wu | 307/66 |
| 2014/0032002 A1 * | 1/2014 | Iwashima et al. | 700/295 |

FOREIGN PATENT DOCUMENTS

| | | | |
|---|---|---|---|
| DE | 20113125 U1 | 2/2002 | |
| DE | 10103336 C1 | 12/2002 | |
| DE | 202010005406 U1 | 10/2011 | |
| DE | 202010005409 U1 | 10/2011 | |
| JP | 2005053693 A * | 3/2005 | B66F 9/24 |

OTHER PUBLICATIONS

Denmark search report issued on Jan. 10, 2013.
Denmark Official Action issued on Jan. 31, 2014.
Denmark Search Report issued on Jan. 31, 2014.
European Patent Office Official Action issued on Apr. 29, 2013.
1st OA dated Apr. 7, 2014 of the corresponding Taiwan patent application No. 101111463.

* cited by examiner

STANDBY BATTERY BOX FOR ELECTRIC CYLINDER

BACKGROUND OF THE INVENTION

1. Field of the Invention

The present invention relates to a control system, and in particular to a standby battery box capable of providing electricity to a control box for driving the electric cylinder.

2. Description of Prior Art

The bottom of a sickbed used in a hospital is often mounted with an electric cylinder control apparatus. A control box in the electric cylinder control apparatus is used to drive the electric cylinder to thereby adjust the height of the sickbed and the inclination angle of a mattress. In thus way, a user can lie on the sickbed conveniently and comfortably.

The electric cylinder control apparatus provided on the sickbed has a control box, a standby battery box, and an electric cylinder. The electric cylinder is electrically connected to the control box. The standby battery box is assembled with and electrically connected to the control box. After the standby battery box is fully charged, the standby battery box can provide the electricity necessary for the operation of the control box. When the control box receives signals inputted from an external operation interface, the control box can control the action of the electric cylinder to thereby adjust the height of the sickbed or inclination angle of the mattress.

After the standby battery box of the electric cylinder is fully charged, the electric cylinder is mounted to the sickbed. When the sickbed equipped with the electric cylinder or the electric cylinder alone is delivered to the hospital and a power switch is pressed for test or use, the control box often cannot be activated to control the action of the electric cylinder. The chief reason for this phenomenon lies in that the electricity stored in a rechargeable battery of the control box has been exhausted. Since a charge-discharge device provided in the standby battery box and the components provided on a circuit board of the control box have internal resistances. Such internal resistances cause the rechargeable battery to discharge slowly and continuously. As a result, after a long period of time in storing or delivering the electric cylinder, the electricity stored in the rechargeable battery of the control box will be exhausted completely.

SUMMARY OF THE INVENTION

In order to solve the problems of prior art, the present invention is to provide a standby battery box for an electric cylinder, in which a switch unit is provided on the standby battery box for shutting off or starting up the electricity. During the storage or delivery, the switch unit can be pressed to prevent the standby battery box from discharging to exhaust its electricity.

The present invention provides a standby battery box for an electric cylinder, electrically connected to a control box for driving the electric cylinder and including:

a charge-discharge device comprising a discharge unit and a switch unit electrically connected to the discharge unit; and a rechargeable battery electrically connected to the charge-discharge device;

wherein the charge-discharge device cannot supply power when the switch unit is pressed to turn the discharge unit into an OFF state, the charge-discharge device delivers the electricity of the rechargeable battery into the control box when the switch unit is pressed to turn the discharge unit into an ON state.

Preferably, the discharge unit of the charge-discharge device is connected to a voltage detection unit and a control unit. When the voltage detection unit detects an excessively low discharging voltage in the rechargeable battery, the voltage detection unit outputs a signal to the control unit. The control unit outputs a control signal to the discharge unit to stop the discharging of the discharge unit.

Preferably, the control unit of the charge-discharge device is electrically connected to a protection unit, a power conversion unit and a voltage detection unit. The control unit is configured to feed back a signal to the control unit when the voltage detection unit detects an excessive charging voltage. The control unit outputs a signal to drive the protection unit to thereby cut off the power supply.

Preferably, the protection unit is electrically connected to the external control box. When the rechargeable battery is excessively charged, the protection unit is configured to cut off the power inputted from the control box.

Preferably, the power conversion unit is electrically connected to the protection unit for converting a direct current power outputted from the protection unit into a direct current power of constant voltage and current, thereby charging the rechargeable battery.

Preferably, the voltage detection unit of the charge-discharge device is electrically connected to the power conversion unit for causing the protection unit to cut off the power when the discharging voltage of the rechargeable battery is detected too high, and stopping the discharging of the rechargeable battery when the discharging voltage of the rechargeable voltage is detected too low.

Preferably, the charge-discharge device further comprises a display unit electrically connected to the protection unit and the discharge unit. The display unit is lighted up during the discharging of the rechargeable battery, thereby displaying a state that the standby battery box is discharging.

Preferably, the display unit is a light emitting diode.

Preferably, the switch unit comprises a shutoff switch and a startup switch.

Preferably, the discharge unit is in open circuit when the shutoff switch is pressed, so that the discharge unit stops delivering power to the control box.

Preferably, the control unit ceases the action of the shutoff switch when the control box is electrically connected to an alternate current power source.

Preferably, the discharge unit is in ON state when the startup switch is pressed, thereby delivering electricity to the control box.

Preferably, the rechargeable battery is a lead acid battery.

DETAILED DESCRIPTION OF THE INVENTION

The technical contents and detailed description of the present invention will be described hereinafter with reference to the accompanying drawings.

Figure 1:
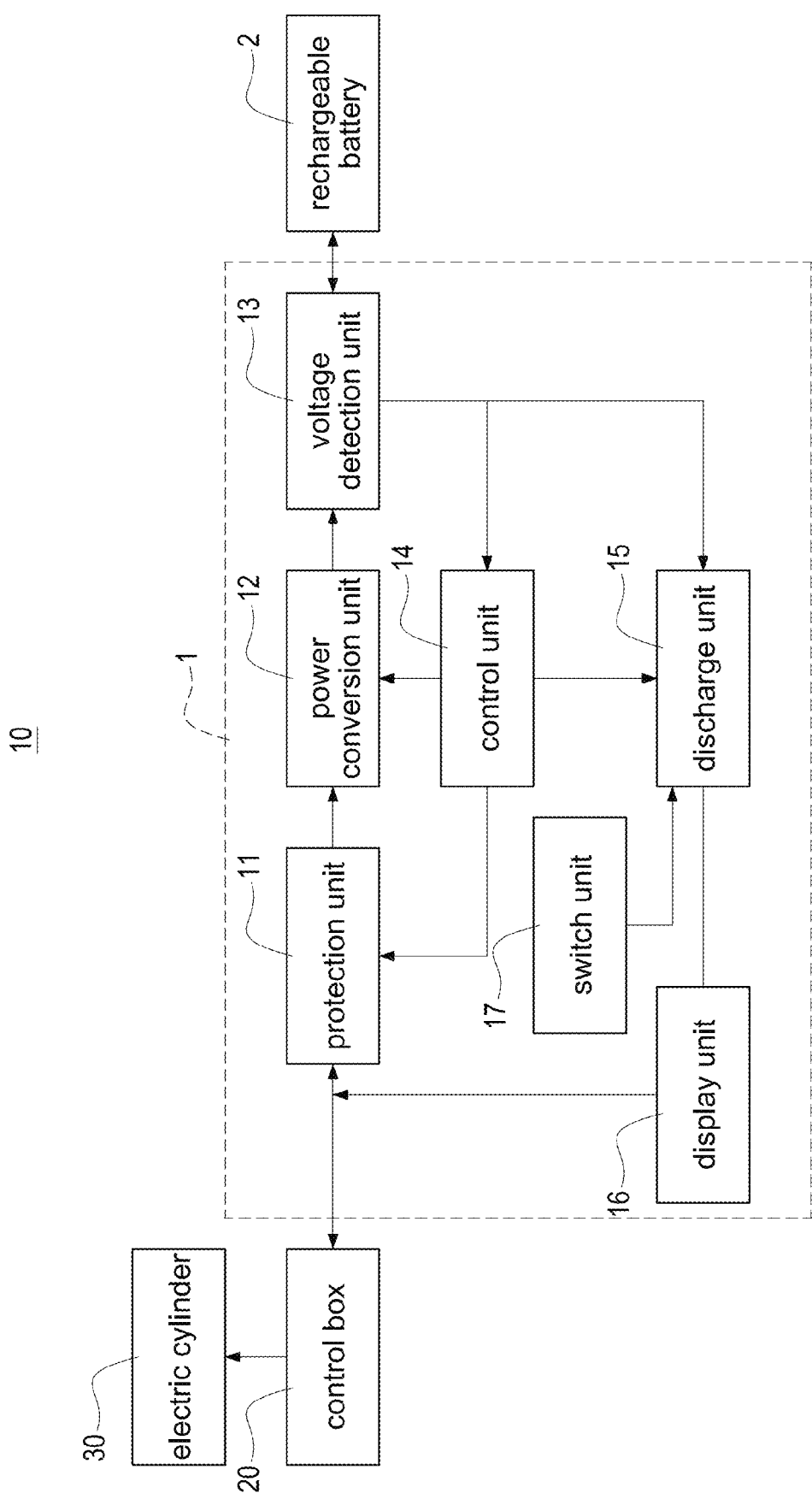
FIG. 1 is a block view showing the electrical connection among the standby battery box of the present invention, the control box and the electric cylinder.
Figure 2:
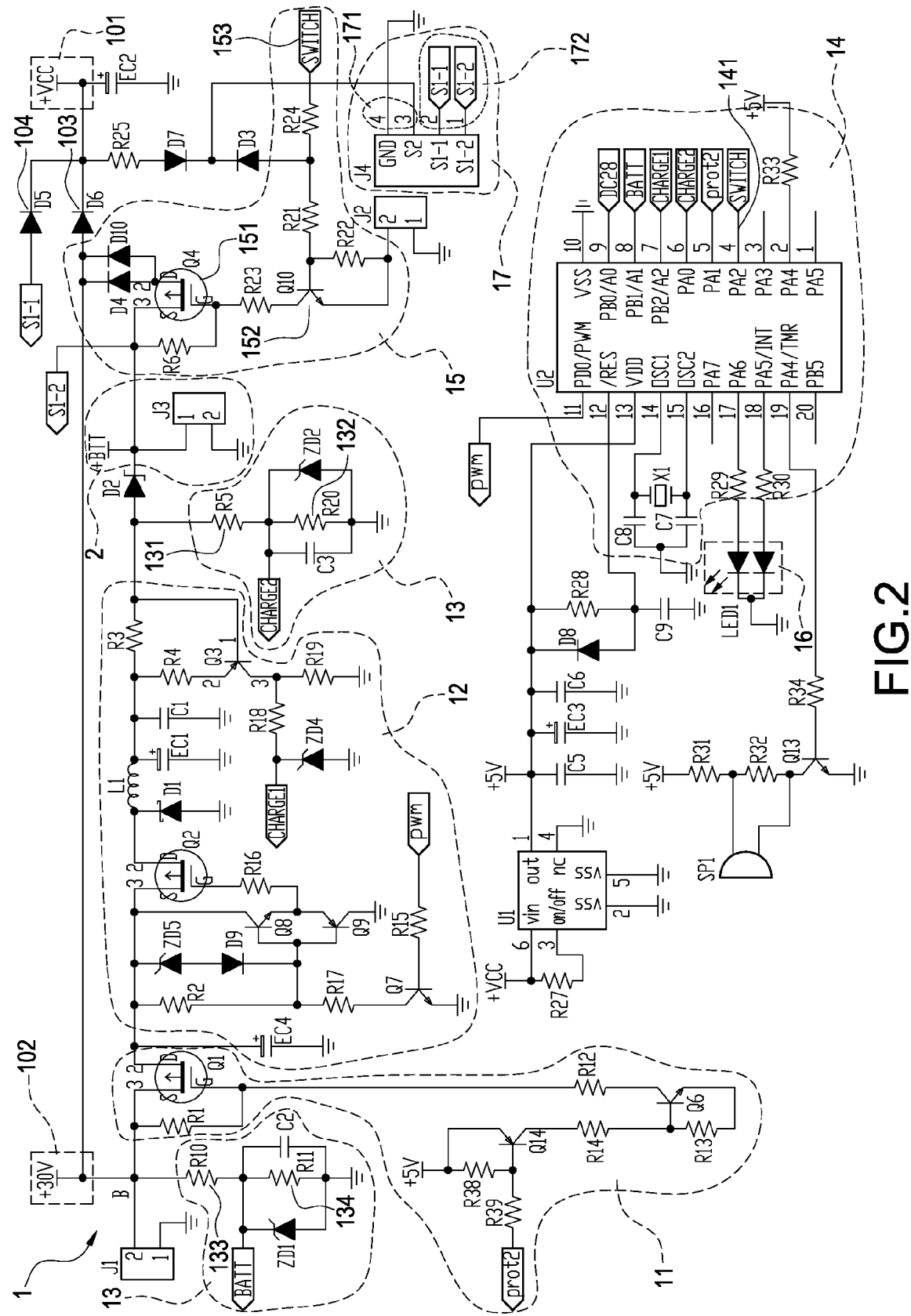
FIG. 2 is a schematic view showing the circuitry of the standby battery box in accordance with the present invention.

FIG. 1 is a block view showing the electrical connection among the standby battery box of the present invention, the control box and the electric cylinder. FIG. 2 is a schematic view showing the circuitry of the standby battery box in accordance with the present invention. The present invention provides a standby battery box 10 for an electric cylinder, which includes a charge-discharge device 1 and a rechargeable battery 2.

The charge-discharge device 1 comprises a protection unit 11, a power conversion unit 12, a voltage detection unit 13, a control unit 14, a discharge unit 15, a display unit 16, and a switch unit 17.

The protection unit 11 is electrically connected to an external control box 20. When the rechargeable battery 2 is excessively charged, the protection unit 11 can cut off the power inputted by the control box 20.

The power conversion unit 12 is electrically connected to the protection unit 11 for converting the DC power outputted by the protection unit 11 into a DC power of constant voltage and current, thereby charging the rechargeable battery 2.

The voltage detection unit 13 is electrically connected to the power conversion unit 12. The voltage detection unit 13 includes a first voltage divider resistor (R5) 131 and a second voltage divider resistor (R20) 132. The voltage divided by the first voltage divider resistor 131 and the second voltage divider resistor 132 is transmitted to the control unit 14. In this way, the protection unit 11 can be activated to cut off the power when detecting an excessively high charging voltage in the rechargeable battery 2. The voltage detection unit 13 further includes a third voltage divider resistor (R10) 133 and a fourth voltage divider resistor (R11) 134. The voltage divided by the third voltage divider resistor 133 and the fourth voltage divider resistor 134 is transmitted to the control unit 14. In this way, the control unit 14 is activated to output a control signal to the discharge unit 15 when detecting an excessively low charging voltage in the rechargeable battery 2. In this way, the discharge unit 15 can stop discharging electricity.

The control unit 14 is electrically connected to the protection unit 11, the power conversion unit 12 and the voltage detection unit 13. The control unit 14 is configured to feed back a signal to the control unit 14 when detecting an excessively high discharging voltage in the voltage detection unit 13. The control unit 14 outputs a signal to drive the protection unit 11 to thereby cut off the power, thereby preventing the rechargeable battery 2 from damage caused by excessive charge.

The discharge unit 15 is electrically connected to the voltage detection unit 13 and the control unit 14. When the voltage detection unit 13 detects an excessively low discharging voltage in the rechargeable battery 2, the voltage detection unit 13 outputs a signal to the control unit 14. The control unit 14 outputs a control signal to the discharge unit 15, thereby stopping the discharging of the discharge unit 14.

The display unit 16 is electrically connected to the protection unit 11, the discharge unit 15 and the control box 20. The rechargeable battery 2 discharges electricity to provide the necessary power to the control box 20. At this time, the display unit 16 is lighted up to display a situation that the standby battery box 10 is discharging. In the drawings, the display unit 16 is a light emitting diode.

The switch unit 17 comprises a shutoff switch 171 and a startup switch 172 both electrically connected to the discharge unit 15. The switch unit 17 is configured to control a first transistor (Q4) 151 of the discharge unit 15. When the shutoff switch 171 is pressed, a third pin and a fourth pin are in short circuit, so that a second transistor (Q10) 152 of the discharge unit 15 is OFF. In this way, the first transistor (Q4) 151 is OFF, so that the discharge unit 15 is in open circuit. At this time, a first voltage end 101 of the +VCC has zero volt, so that the whole system is shut off due to no power. After the control box 20 is supplied with electricity, a second voltage end 102 of 30 volts can supply electricity directly via a diode (D6) 103. Although pressing the shutoff switch 171 turns off the first transistor 151 and the second transistor 152, the first voltage end 101 of +VCC still has electricity, so that the whole system can operate normally without being affected. After the startup switch 172 is pressed, a first pin and a second pin are in short circuit. The voltage of the rechargeable battery 2 is conducted to the first voltage end 101 of the +VCC via a diode (D5) 104, so that the whole system can be started and activated. After the activation of the whole system, a fourth pin (SWITCH) 141 of the control unit 14 outputs a voltage of 5 volts, and this voltage is inputted into a switch pin (SWITCH) 153 of the discharge unit 15. In this way, the second transistor 152 and the first transistor 151 are kept ON, so that the first voltage end 101 of the +VCC still has power even through the startup switch 172 is released.

The rechargeable battery 2 is electrically connected to the voltage detection unit 13 for receiving the power outputted by the voltage detection unit 13. In this way, the rechargeable battery 2 can be charged. In the drawings, the rechargeable battery is a lead acid battery.

Figure 3:
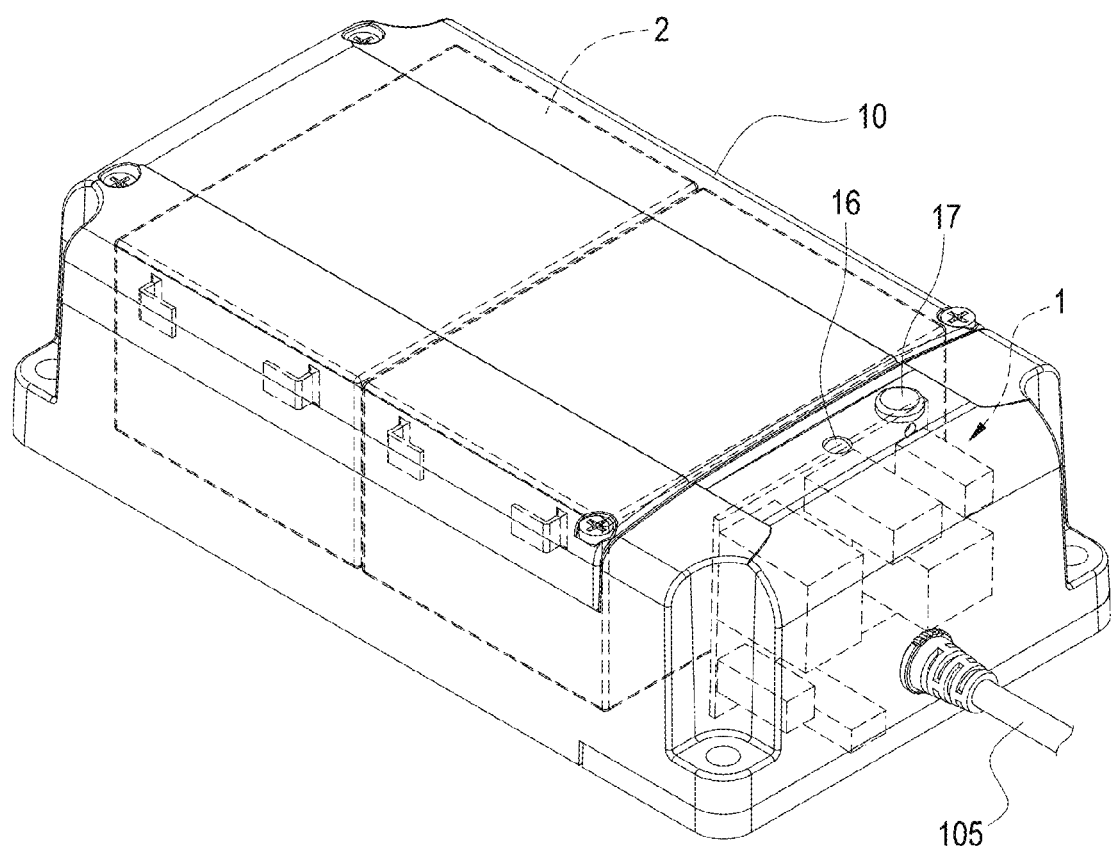
FIG. 3 is a schematic view showing the external appearance of the standby battery box in accordance with the present invention.
Figure 4:
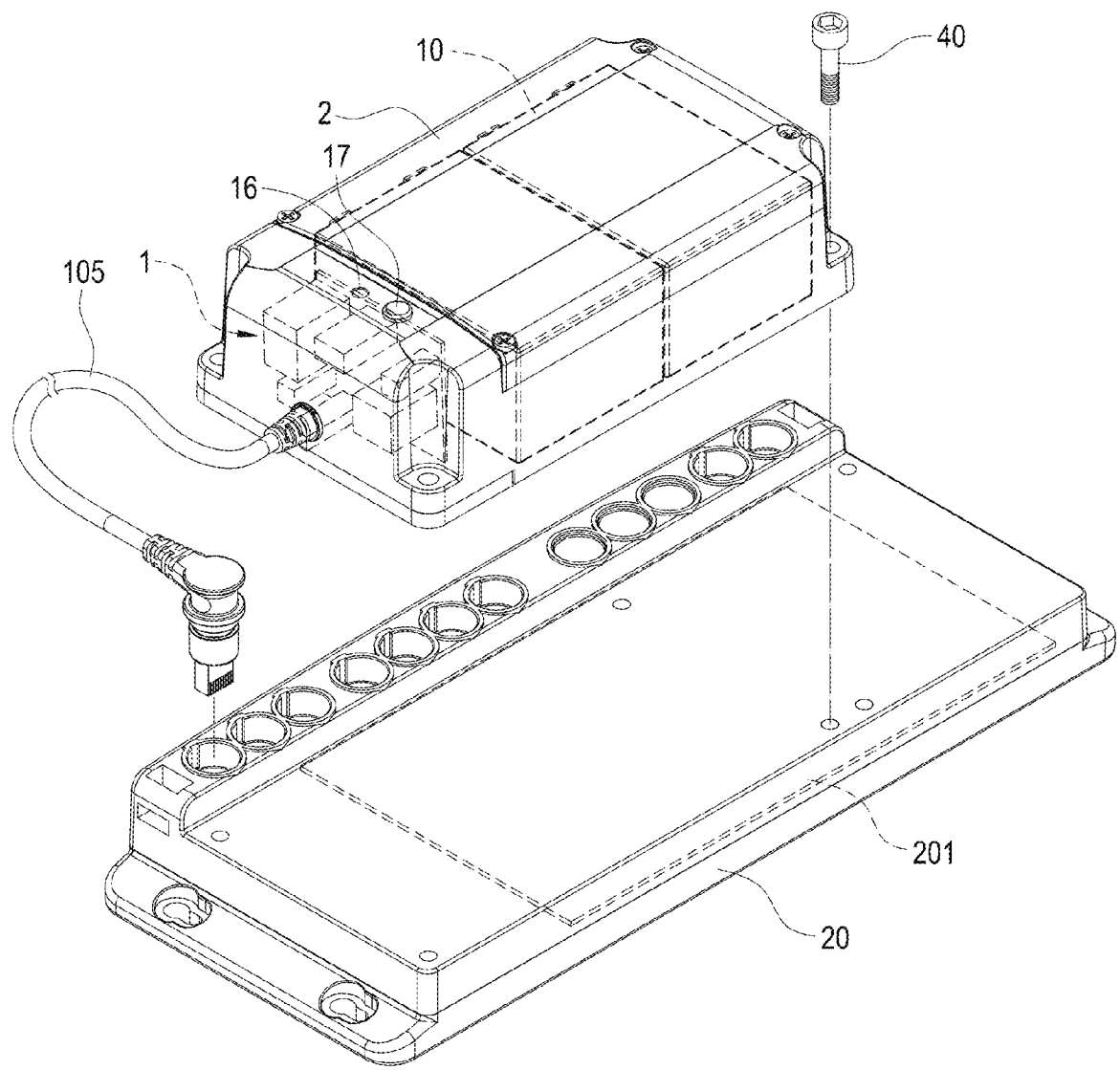
FIG. 4 is an exploded perspective view showing the standby battery box and the control box in accordance with the present invention.
Figure 5:
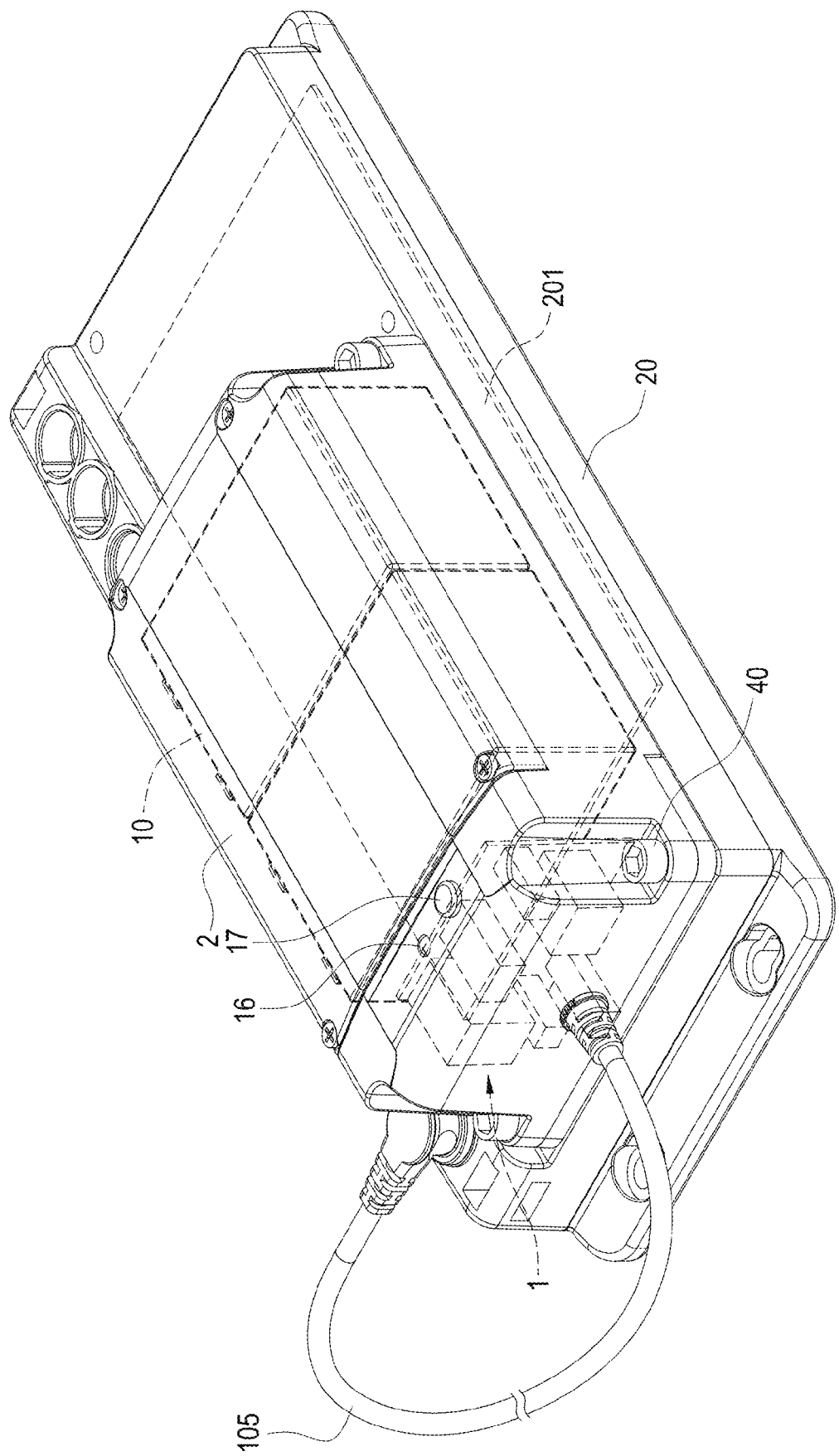
FIG. 5 is an assembled perspective view showing the standby battery box and the control box in accordance with the present invention.

Please refer to FIGS. 3 to 5. FIG. 3 is a schematic view showing the external appearance of the standby battery box in accordance with the present invention. FIG. 4 is an exploded perspective view showing the standby battery box and the control box in accordance with the present invention. FIG. 5 is an assembled perspective view showing the standby battery box and the control box in accordance with the present invention. Please also refer to FIG. 1. As shown in these figures, when the standby battery box 10 is assembled with the control box 20, the standby battery box 10 is fixed to the control box 20 via screws 40. Then, a power line 105 of the standby battery box 10 is inserted into the control box 20, so that a circuit board 201 of the control box 20 can be electrically connected to the interior of the standby battery box 10.

After the control box 20 is supplied with electricity, the DC power converted by the control box 20 is transmitted to the standby battery box 10 for charging the rechargeable battery 2 via the protection unit 11, the power conversion unit 12 and the voltage detection unit 13 of the charge-discharge device 1. When the voltage detection unit 13 detects an excessively high charging voltage in the rechargeable battery 2, the voltage detection unit 13 outputs a signal to the control unit 14. The control unit 14 outputs a signal to drive the protection unit 11 to cease the power output (cease the power supply).

During the delivery of the standby battery box 10, the shutoff switch 171 of the switch unit 17 is pressed to make the discharge unit 15 in open circuit while the control unit 14 is kept inactive. In this way, the electricity of the rechargeable battery 2 will not be exhausted during the delivery of the standby battery box 10.

After the startup switch 172 is pressed, the discharge unit 15 is in an ON state while the control unit 14 is activated. The electricity of the rechargeable battery 2 can be transmitted to the control box 2. During the power transmission, the display unit 10 is lighted up to display that the rechargeable battery 2 is discharging.

After the control box 20 is supplied with electricity (plugged into AC power), the power transmitted to the standby battery box 10 is used to charge the rechargeable battery 2 while the control unit 14 ceases the action of the shutoff switch 171. At this time, pressing the shutoff switch 171 does not have any action.

Figure 6:
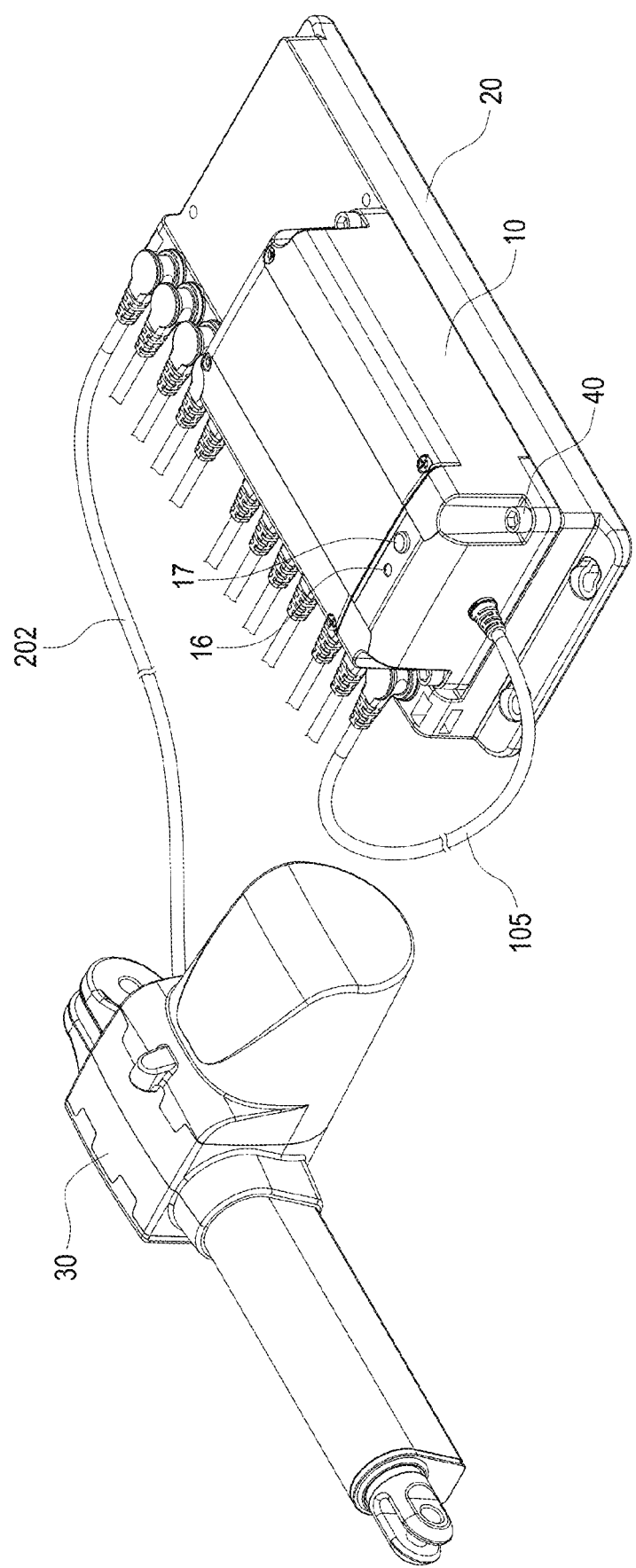
FIG. 6 is a schematic view showing the operating state of the present invention.

Please refer to FIG. 6, which is a schematic view showing the operating state of the present invention. As shown in this figure, the standby battery box 10 and the control box 20 are assembled with and electrically connected to each other. The control box 20 has a plurality of control lines 202. One of the control lines 202 is electrically connected to the electric cylinder 30. After the startup switch 172 of the switch unit 17 provided on the charge-discharge device 1 of the standby battery box 20 is pressed, the power of the rechargeable battery 2 is transmitted from the power line 105 to the circuit board 201 of the control box 20. At the time, the control box 20 sends a control signal from the control line 202 to the electric cylinder 30, so that the electric cylinder 30 can operate immediately, thereby adjusting the height of the sickbed and the inclination angle of the mattress.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A standby battery box for an electric cylinder, electrically connected to a control box for driving the electric cylinder and including:
   a charge-discharge device comprising a discharge unit and a switch unit electrically connected to the discharge unit, the discharge unit comprising a transistor electrically connected to a voltage end; and
   a rechargeable battery electrically connected to the charge-discharge device;
   wherein the switch unit comprises a shutoff switch and a startup switch, the shutoff switch and the startup switch electrically connected to the transistor;
   the transistor is in opened circuit and no power is supplied to the voltage end when the shutoff switch is pressed;
   after the control box is supplied with AC power, the AC power is supplied to the voltage end even when the shutoff switch is still pressed;
   electrical power is supplied from the rechargeable battery to the voltage end and the transistor is kept turning on when the startup switch is pressed, whereby the voltage end still has power even through the startup switch is released.

2. The standby battery box for an electric cylinder according to claim 1, wherein the discharge unit of the charge-discharge device is connected to a voltage detection unit and a control unit, the voltage detection unit outputs a signal to the control unit when the voltage detection unit detects an excessively low discharging voltage in the rechargeable battery, and the control unit outputs a control signal to the discharge unit to stop a discharging of the discharge unit.

3. The standby battery box for an electric cylinder according to claim 2, wherein the control unit of the charge-discharge device is electrically connected to a protection unit, a power conversion unit and a voltage detection unit, the control unit is configured to feed back a signal to the control unit when the voltage detection unit detects an excessive charging voltage, and the control unit outputs a signal to drive the protection unit to thereby cut off the AC power.

4. The standby battery box for an electric cylinder according to claim 3, wherein the protection unit is electrically connected to the control box, the protection unit is configured to cut off the AC power inputted from the control box when the rechargeable battery is excessively charged.

5. The standby battery box for an electric cylinder according to claim 3, wherein the power conversion unit is electrically connected to the protection unit for converting a direct current power outputted from the protection unit into a direct current power of constant voltage and current, thereby charging the rechargeable battery.

6. The standby battery box for an electric cylinder according to claim 3, wherein the voltage detection unit of the charge-discharge device is electrically connected to the power conversion unit for causing the protection unit to cut off the AC power when the discharging voltage of the rechargeable battery is detected to be too high, and stopping the discharging of the rechargeable battery when the discharging voltage of the rechargeable voltage is detected to be too low.

7. The standby battery box for an electric cylinder according to claim 3, wherein the charge-discharge device further comprises a display unit electrically connected to the protection unit and the discharge unit, the display unit is lighted up during the discharging of the rechargeable battery, thereby displaying a state that the standby battery box is discharging.

8. The standby battery box for an electric cylinder according to claim 7, wherein the display unit is a light emitting diode.

9. The standby battery box for an electric cylinder according to claim 4, wherein the charge-discharge device further comprises a display unit electrically connected to the protection unit and the discharge unit, the display unit is lighted up during the discharging of the rechargeable battery, thereby displaying a state that the standby battery box is discharging.

10. The standby battery box for an electric cylinder according to claim 9, wherein the display unit is a light emitting diode.

11. The standby battery box for an electric cylinder according to claim 5, wherein the charge-discharge device further comprises a display unit electrically connected to the protection unit and the discharge unit, the display unit is lighted up during the discharging of the rechargeable battery, thereby displaying a state that the standby battery box is discharging.

12. The standby battery box for an electric cylinder according to claim 11, wherein the display unit is a light emitting diode.

13. The standby battery box for an electric cylinder according to claim 6, wherein the charge-discharge device further comprises a display unit electrically connected to the protection unit and the discharge unit, the display unit is lighted up during the discharging of the rechargeable battery, thereby displaying a state that the standby battery box is discharging.

14. The standby battery box for an electric cylinder according to claim 13, wherein the display unit is a light emitting diode.

15. The standby battery box for an electric cylinder according to claim 1, wherein the switch unit comprises a shutoff switch and a startup switch.

16. The standby battery box for an electric cylinder according to claim 15, wherein the discharge unit is in open circuit when the shutoff switch is pressed, so that the discharge unit stops delivering power to the control box.

17. The standby battery box for an electric cylinder according to claim 16, wherein the control unit ceases the action of the shutoff switch when the control box is electrically connected to an alternate current power source.

18. The standby battery box for an electric cylinder according to claim 17, wherein the discharge unit is in ON state when the startup switch is pressed, thereby delivering electricity to the control box.

19. The standby battery box for an electric cylinder according to claim 1, wherein the rechargeable battery is a lead acid battery.

\* \* \* \* \*